(12) United States Patent  
Seki (10) Patent No.: US 7,773,154 B2  
(45) Date of Patent: Aug. 10, 2010

(54) INFORMATION PROCESSING APPARATUS FOR PLAYBACK OF MULTIPLE DISPLAY DEVICES

(75) Inventor: Michio Seki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/337,531

(22) Filed: Dec. 17, 2008

(65) Prior Publication Data

US 2009/0165059 A1    Jun. 25, 2009

(30) Foreign Application Priority Data

Dec. 21, 2007    (JP) .............................. 2007-330444

(51) Int. Cl.
H04N 5/00 (2006.01)
(52) U.S. Cl. ..................................... 348/552
(58) Field of Classification Search ................ 348/734, 348/552, 553, 705, 706, 725; 340/825.69, 340/825.72; 713/300
See application file for complete search history.

(56) References Cited

U.S. PATENT DOCUMENTS 5,297,211 A * 3/1994 Noro ........................... 381/81
7,274,303 B2 * 9/2007 Dresti et al. ............ 340/825.72
7,499,462 B2 * 3/2009 MacMullan et al. .......... 370/401
7,593,979 B2 * 9/2009 Seki et al. .................... 709/200
2008/0148075 A1 * 6/2008 Reder ........................ 713/300

FOREIGN PATENT DOCUMENTS

| JP | H07-336780 A | 12/1995 |
| JP | 10-326141 | 12/1998 |
| JP | 2001-268659 A | 9/2001 |
| JP | 2002-064885 A | 2/2002 |
| JP | 2002-315074 A | 10/2002 |
| JP | 2004-096280 | 3/2004 |
| JP | 2005-012508 A | 1/2005 |
| JP | 2007-208547 | 8/2007 |

* cited by examiner

Primary Examiner—Paulos M Natnael
(74) Attorney, Agent, or Firm—Knobbe, Martens, Olson & Bear LLP (57) ABSTRACT

An information processing apparatus includes: an information transmitter; a plurality of receivers that receive information transmitted from the information transmitter; a storage unit that stores first information indicating an output destination of display data and sound data, the first information being correlated with and second information indicating ON/OFF states of each of the receivers; a setting unit that sets the ON/OFF states based on the first information and the second information when the output destination of the display data and sound data is switched.

4 Claims, 7 Drawing Sheets

| DISPLAY DEVICE | | | INFRARED RECEPTION | |
|---|---|---|---|---|
| OUTPUT MODE | MONITOR 1 | MONITOR 2 | DIRECT INPUT | EXTERNAL INPUT |
| SINGLE DISPLAY | LCD | NONE | ON | OFF |
| SINGLE DISPLAY | CRT | NONE | OFF | ON |
| SINGLE DISPLAY | TV | NONE | OFF | ON |
| SIMULTANEOUS DISPLAY | LCD | CRT | ON | OFF |
| SIMULTANEOUS DISPLAY | LCD | TV | OFF | ON |
| MULTI MONITOR | LCD | CRT | ON | OFF |
| MULTI MONITOR | CRT | LCD | OFF | ON |
| MULTI MONITOR | LCD | TV | OFF | ON |
| MULTI MONITOR | TV | LCD | ON | OFF |
| . . . | . . . | . . . | . . . | . . . |

INFORMATION PROCESSING APPARATUS FOR PLAYBACK OF MULTIPLE DISPLAY DEVICES

CROSS-REFERENCE TO RELATED APPLICATIONS

This application is based upon and claims the benefit of priority from Japanese Patent Application No. 2007-330444, filed Dec. 21, 2007, the entire contents of which are incorporated herein by reference.

BACKGROUND OF THE INVENTION

1. Field of the Invention

The present invention relates to an information processing apparatus that outputs a display screen or sound to a plurality of display devices and includes a plurality of IR remote control receiving units and in particular, to an information processing apparatus capable of performing switching between IR remote control receiving units in synchronization with switching of an output destination of a display screen or sound.

2. Description of the Related Art

In recent years, in an information processing apparatus, such as a notebook PC (personal computer), display devices such as an external monitor or a TV are connected so that an output destination of the display screen or sound can be switched between the display devices. In this case, a user may switch a display device that performs output by using utility of an output driver, a hot key (shortcut key using a keyboard), and the like in the information processing apparatus.

Therefore, an operation system in which a remote controller determines a display to be operated by transmitting an operation code for a corresponding display toward the display on the basis of a recognition code according to the position is described (refer to JP-A-2004-96280).

An information processing apparatus with an AV function generally includes an infrared remote controller (hereinafter, referred to as an IR remote controller) for AV application operations, such as TV watching or DVD reproduction, and an IR remote control receiving unit is provided in the main body of the information processing apparatus. A user can operate AV application at the position distant from the main body of the information processing apparatus by operating the IR remote controller toward the remote control receiving unit provided in the main body of the information processing apparatus.

Furthermore, in the case of a notebook type information processing apparatus, analog TV output terminals such as an analog RGB output, an S terminal, or a composite and digital TV outputs such as a D terminal or an HDMI are provided as external display interfaces in addition to an LCD built in the main body, such that video output using AV application can be performed on a display device other than the built-in LCD. In the case where an external display device is connected as described above, a display device that is an output destination of the display screen or sound can be switched according to a user's instruction by key operation or using utility of a display driver.

Here, in the case where an image is output to an external display device, a user usually tends to operate the IR remote controller toward the display screen. However, in the information processing apparatus, the IR remote control receiving unit is built in the main body. Accordingly, even when the external display device is positioned apart from the information processing apparatus, it is necessary to operate the remote controller toward the information processing apparatus instead of the external display device.

On the other hand, a case in which a remote control receiving unit is provided by cable connection separately from the main body of an information processing apparatus by using an RS-232C interface or a USB interface of the information processing apparatus may also be considered. In this case, the remote control receiving unit may be provided near the external display device, such as a television, within a range of cable length. However, even in the case when the LCD built in the information processing apparatus is used, there was no choice but to operate the IR remote controller toward the remote controller receiving unit instead of the information processing apparatus.

BRIEF DESCRIPTION OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION OF THE PREFERRED EMBODIMENT

Various embodiments according to the invention will be described hereinafter with reference to the accompanying drawings. In general, according to one embodiment of the invention, an information processing apparatus includes: an information transmitter; a plurality of receivers that receive information transmitted from the information transmitter; a storage unit that stores first information indicating an output destination of display data and sound data, the first information being correlated with and second information indicating ON/OFF states of each of the receivers; a setting unit that sets the ON/OFF states based on the first information and the second information when the output destination of the display data and sound data is switched.

Figure 1:
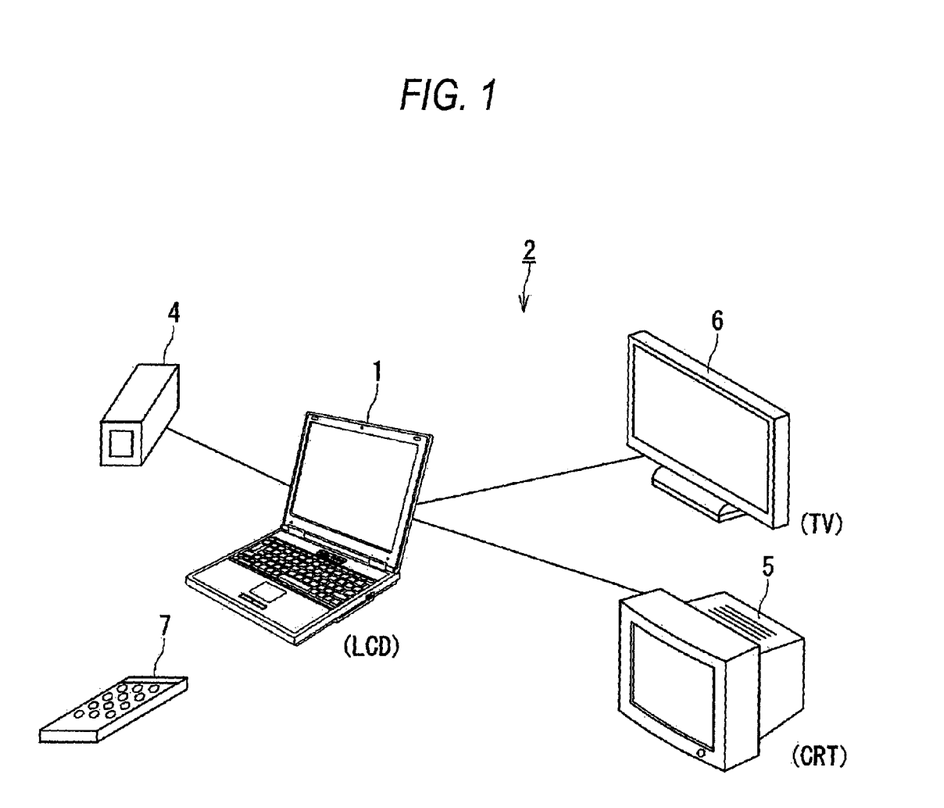
FIG. 1 is an exemplary view illustrating the system configuration of an information processing system in an embodiment.

An information processing apparatus according to an embodiment of the invention will be described with reference to the accompanying drawings. FIG. 1 is a view illustrating the system configuration of an information processing system 2 to which an information processing apparatus 1 according to the invention is applied. In the information processing system 2, a plurality of display devices are connected to the information processing apparatus 1. The display devices are an external monitor 5, such as an analog RGB monitor, and a TV (television) 6, for example. The TV 6 reproduces images, such as a composite image and an S image.

The information processing apparatus 1 includes an S video terminal, a D connector, an HDMI terminal, and the like used when transmitting a video signal. For example, the external monitor 5 or the TV 6 is connected to the information processing apparatus 1 through the terminals. Hereinafter, the external monitor 5 is called a 'CRT' and the TV 6 is called a 'TV'.

Figure 2:
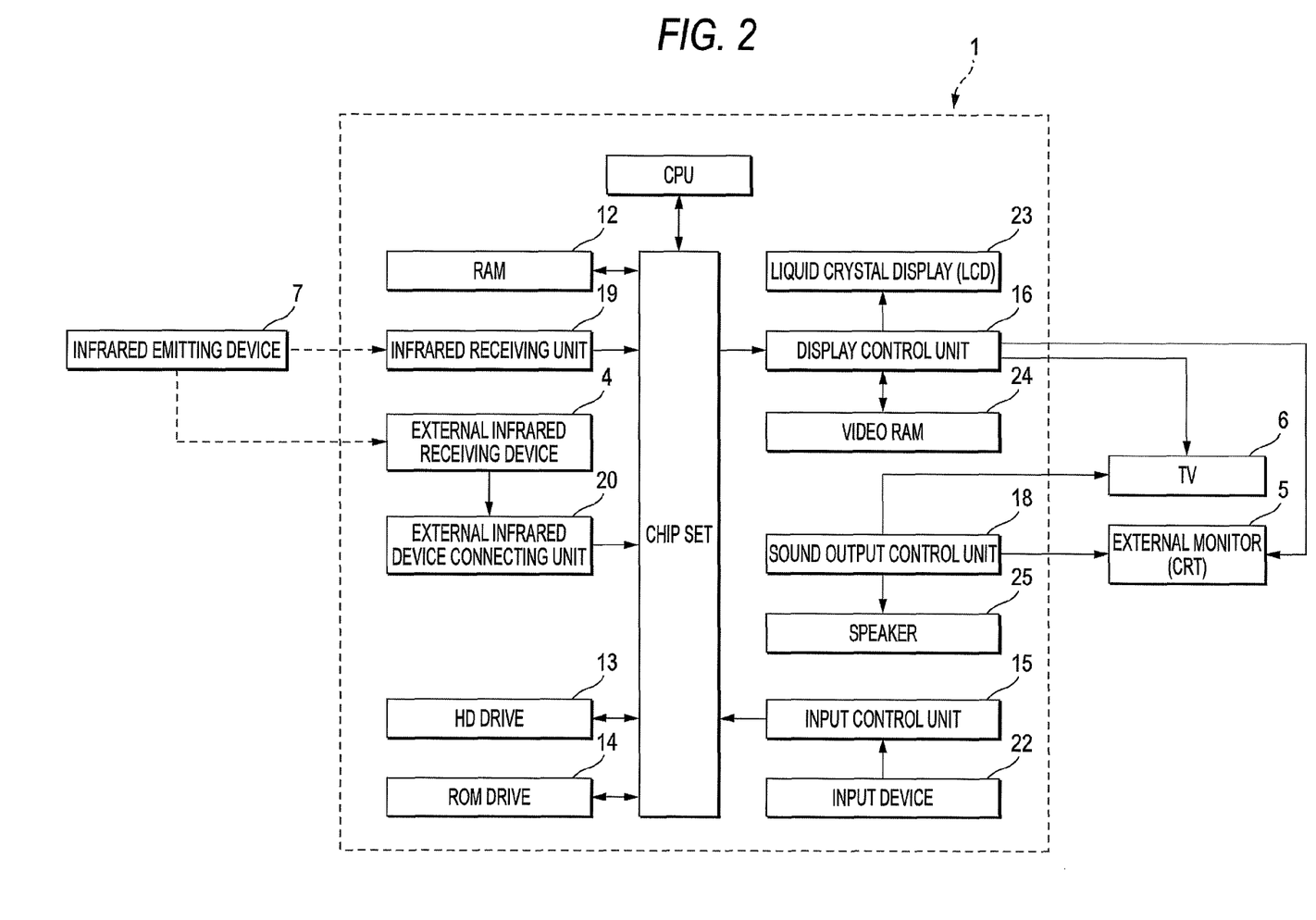
FIG. 2 is an exemplary functional block diagram illustrating the information processing apparatus in the embodiment.

FIG. 2 is a functional block diagram illustrating the information processing apparatus 1. The information processing apparatus 1 is a PC (personal computer) that is generally used. As shown in FIG. 2, the information processing apparatus 1 includes a CPU (central processing unit) 11, a RAM (random access memory) 12, an HD (hard disk) drive 13, a ROM (read only memory) drive 14, an input control unit 15, a display control unit 16, a sound output control unit 18, an infrared receiving unit 19, and an external infrared device connecting unit 20, all of which are communicably connected to one another by a chip set 21.

The CPU 11 makes an overall control of the information processing apparatus 1 and performs infrared receiving control processing and other various kinds of calculation processing or control processing to be described later. The RAM 12 temporarily stores data, which is required for processing, as a working area when the CPU 11 performs processing. The HD drive 13 is a driving device for performing reading and writing on the HD (hard disk) in which a processing program required when the CPU 11 performs processing or data required for processing is stored. The ROM drive 14 is a driving device for performing reading and writing on a recording medium, such as a DVD (digital versatile disk), in which image data and the like are stored. The input control unit 15 includes an input interface over an input device 22, such as a mouse or a keyboard, and transmits a signal input through the input device 22 to the CPU 11.

The display control unit 16 includes a display interface for displaying document data or image data on a liquid crystal display (LCD) 23 or a GPU (graphics processing unit) for outputting frame data loaded to a video RAM 24 to the liquid crystal display 23 and performs display processing on the liquid crystal display 23 on the basis of a control of the CPU 11. In addition, the display control unit 16 includes a display interface for performing display on the external monitor 5, the TV 6, or other display devices, a selector for switching a display destination when the external monitor 5, the TV 6, and other display devices are connected, and a converter which converts a digital signal into an analog image output. In addition, the video RAM 24 is a memory which temporarily stores frame data for display.

The sound output control unit 18 includes an output interface for outputting sound to a speaker 25 built in the information processing apparatus 1 and controls sound output processing on the speaker 25 on the basis of the control of the CPU 11. In addition, the sound output control unit 18 includes a headphone output which is an interface for performing sound output to the external monitor 5 or the TV 6, a converter for performing decoding of sound or conversion of a digital signal into an analog signal, an interface for changing the sound volume, and a means for changing an interface of an output destination of sound output.

The infrared receiving unit 19 has an infrared receiving device built in the information processing apparatus 1 and an interface with the infrared receiving device. When the built-in infrared receiving device has received an infrared ray from an infrared emitting device (infrared transmitting device) 7, the infrared receiving unit 19 generates a signal on the basis of the received infrared ray and transmits the signal to the CPU 11.

The external infrared device connecting unit 20 is wireline connected to the external infrared receiving device 4 provided at the outline of the information processing apparatus 1 and includes an interface with the external infrared receiving device 4. When the external infrared receiving device 4 has received an infrared ray from the infrared emitting device 7, the external infrared device connecting unit 20 acquires a signal on the basis of the infrared ray received from the external infrared receiving device 4 and transmits the signal to the CPU 11.

The chip set 21 is an integrated circuit provided with a memory controller, a bus bridge, an IDE (integrated drive electronics) controller, various kinds of I/O controllers, and the like.

Figure 3:
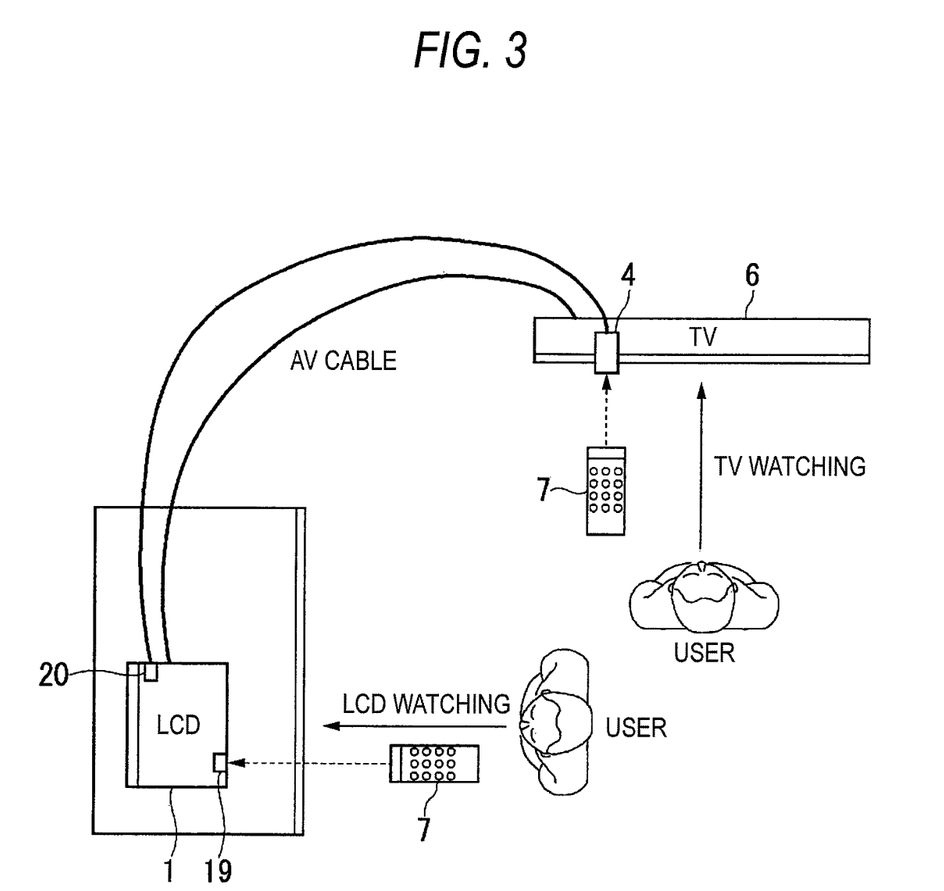
FIG. 3 is an exemplary view for explaining infrared receiving control processing in the information processing apparatus in the embodiment.

As shown in FIG. 3, there is assumed a scene in which when a user executes AV application with the information processing apparatus 1, the user watches a DVD image or a video image in a state where the CRT 5 or a liquid crystal monitor is connected, as an external display device other than the liquid crystal display 23 built in a main body of the information processing apparatus 1, to the information processing apparatus 1 through an analog RGB terminal or the TV 6 is connected, as an external display device other than the liquid crystal display 23 built in a main body of the information processing apparatus 1, to the information processing apparatus 1 through the S video terminal, the D connector, and the HDMI terminal. In such a scene, the user usually watches an image in the form facing a display device that outputs the image.

In the case where the user executes AV application of the information processing apparatus 1 and watches an image using the external display device (for example, the TV 6), an external monitor terminal of the main body of the information processing apparatus 1 and the TV 6 are connected to each other by an AV cable. When the user switches a display device, which outputs a display screen and sound, to the TV 6, an image is displayed on a screen of the TV 6 connected to the information processing apparatus 1.

In general, even in the case when the output destination of an image switches to the external display device, an infrared ray emitted from the infrared emitting device (remote controller) 7 is received in the infrared receiving unit 19 built in the main body of the information processing apparatus 1. Accordingly, the user should operate the remote controller toward the information processing apparatus 1 although the output destination of the image is the external display device.

For this reason, the information processing apparatus 1 includes the external infrared receiving device 4 and the external infrared device connecting unit 20, which acquires information received in the external infrared receiving device 4, in addition to the infrared receiving unit 19 built in the main body. In addition, the external infrared receiving device 4 is provided near the external display device such that the infrared ray emitted from the infrared emitting device 7 can also be received in the external infrared receiving device 4. In addition, it is possible to reduce a user's troublesome operation at the time of display device switching by setting an ON/OFF state of the used infrared receiving device (built-in infrared receiving device, the external infrared receiving device 4, and the like) at the time of switching a display device.

In order to set ON/OFF states of a plurality of infrared receiving devices for receiving infrared rays emitted from the infrared emitting device 7 when switching a display device which outputs a display screen and sound, the HD drive 13 stores switching information 30 in which display devices, which are output destinations, and the ON/OFF states of the infrared receiving devices correspond to each other.

Figure 4:
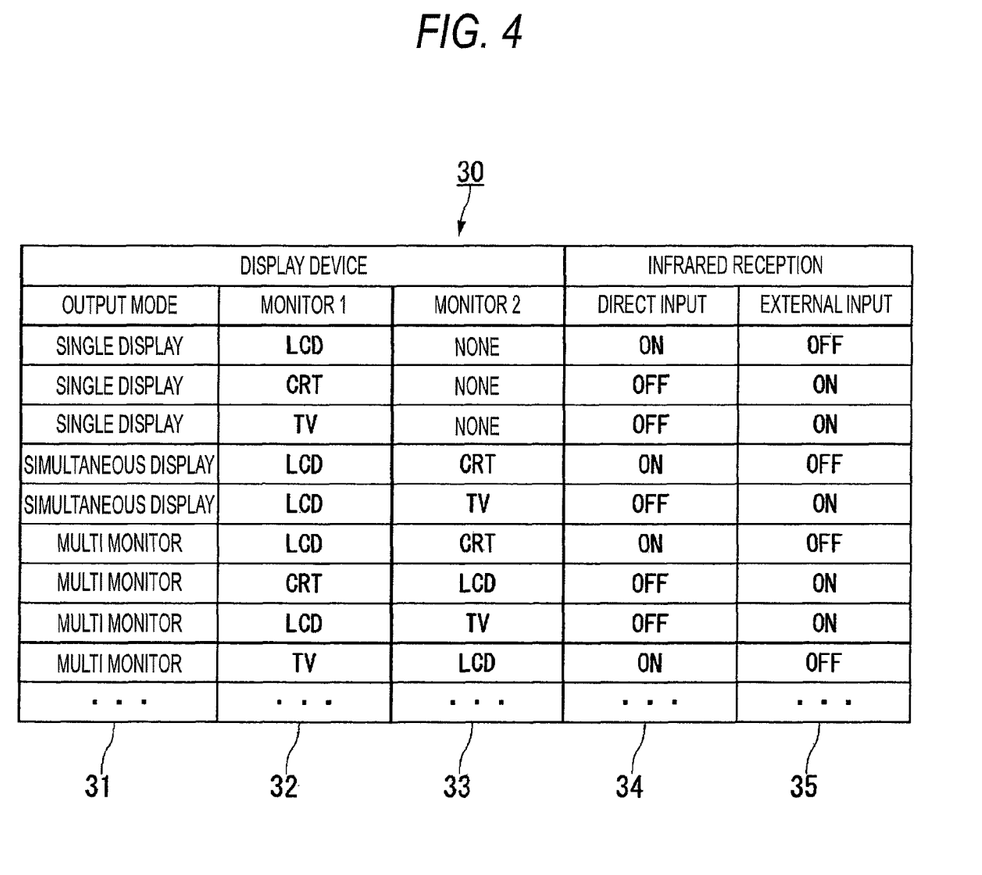
FIG. 4 is an exemplary view illustrating the data configuration of switching information in the embodiment.

As shown in FIG. 4, the switching information 30 is information in which direct input information 34 indicating an ON/OFF state of the built-in infrared receiving device (infrared receiving device included in the infrared receiving unit 19) and external input information 35 indicating an ON/OFF state of the external infrared receiving device 4 connected to the external infrared device connecting unit 20 correspond to display device information configured to include output mode information 31 indicating an output mode of a display device, monitor 1 information 32 indicating a first output destination, and monitor 2 information 33 indicating a second output destination.

Figure 6:
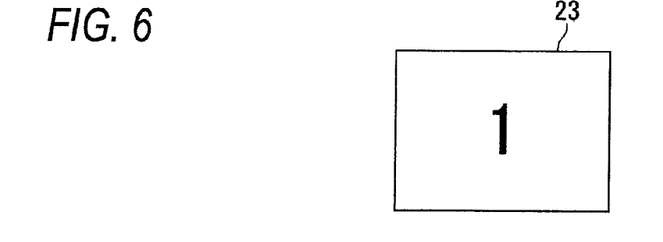
FIG. 6 is an exemplary view illustrating display states of a liquid crystal display of the information processing apparatus in the embodiment and a display device connected to the information processing apparatus.
Figure 7:
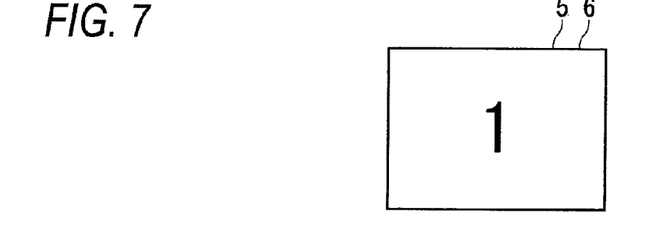
FIG. 7 is an exemplary view illustrating display states of the liquid crystal display of the information processing apparatus and a display device connected to the information processing apparatus.
Figure 8:
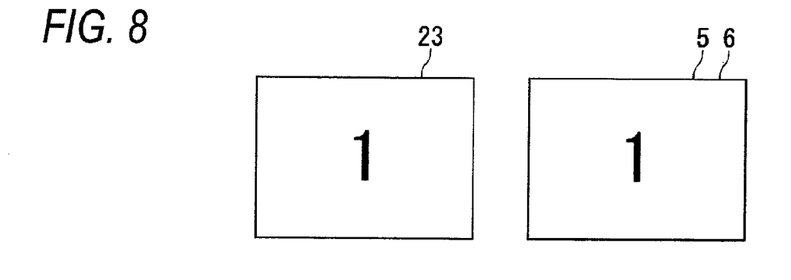
FIG. 8 is an exemplary view illustrating display states of the liquid crystal display of the information processing apparatus and a display device connected to the information processing apparatus.
Figure 9:
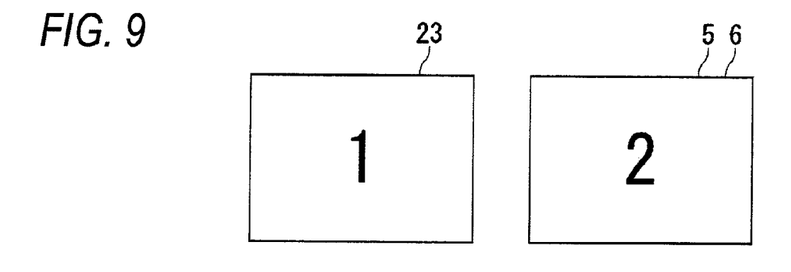
FIG. 9 is an exemplary view illustrating display states of the liquid crystal display of the information processing apparatus and a display device connected to the information processing apparatus.
Figure 10:
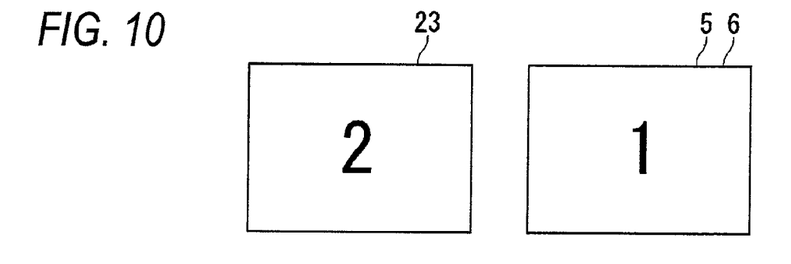
FIG. 10 is an exemplary view illustrating display states of the liquid crystal display of the information processing apparatus and a display device connected to the information processing apparatus.

Examples of the output mode include 'single display', 'simultaneous display', and 'multi monitor'. The 'single display' is an output mode in which display is performed in the liquid crystal display 23 or either one of the external monitor 5 and the TV 6, as shown in FIGS. 6 and 7. The 'simultaneous display' is an output mode in which the same screen is displayed in the liquid crystal display 23 and the external monitor 5 or the liquid crystal display 23 and the TV 6, as shown in FIG. 8. In addition, the 'multi monitor' is an output mode in which different screens, for example, a primary screen (first display screen; indicated as '1' in FIGS. 9 and 10) and a secondary screen (second display screen; indicated as '2' in FIGS. 9 and 10) are displayed on the liquid crystal display 23 and the external monitor 5 or the liquid crystal display 23 and the TV 6, as shown in FIGS. 9 and 10.

Each of the monitor 1 information 32 and the monitor 2 information 33 indicates an output destination which performs display. The output destination is shown only in the monitor 1 information 32 when the output mode is the 'single display', and the output destination is shown in the monitor 1 information 32 and the monitor 2 information 33 when the output mode is the 'simultaneous display'. In addition, when the output mode is the 'multi monitor', an output destination indicating first display information is shown in the monitor 1 information 32 and an output destination indicating second display information is shown in the monitor 2 information 33.

The direct input information 34 indicates an ON/OFF state of an infrared receiving function of the built-in infrared receiving device (infrared receiving unit 19). The external input information 35 indicates an ON/OFF state of an infrared receiving function of the infrared receiving device 4 provided outside.

The switching information 30 is assumed to be set beforehand by a user and be then stored in the HD drive 13. In addition, the switching information 30 is assumed to be arbitrarily rewritten by the user and be then stored in the HD drive 13.

Figure 5:
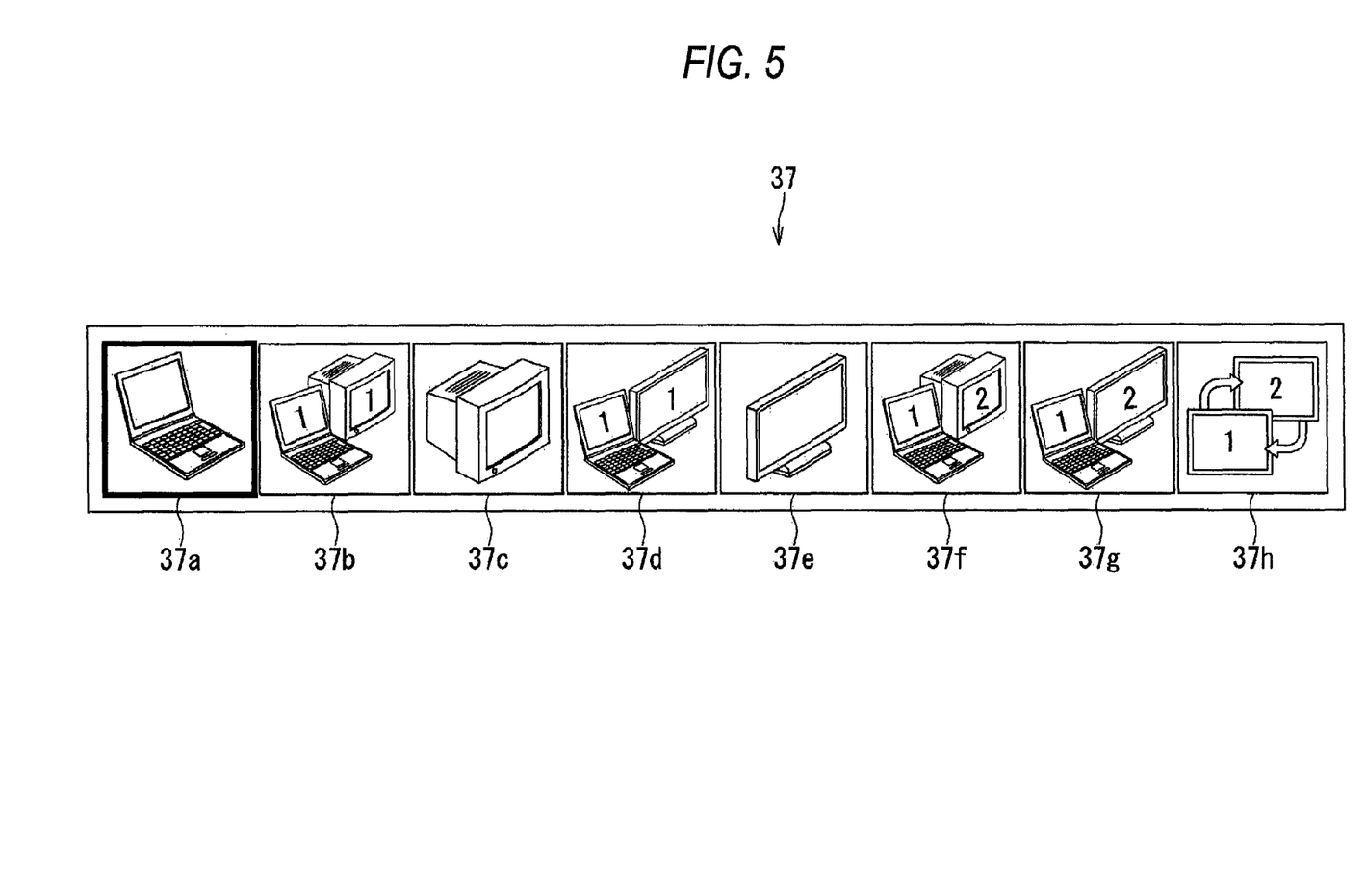
FIG. 5 is an exemplary screen view illustrating a setting screen for setting switching information in the embodiment.

When an output destination related to display processing is set by the user, the CPU 11 sets the ON/OFF state of the infrared receiving device on the basis of the switching information 30. For example, the output destination related to display processing is set by selecting an arbitrary selection item from a setting screen 37 through the input device 22, such as a mouse or a keyboard, after the setting screen 37 shown in FIG. 5 is displayed on the liquid crystal display 23. For example, selection items 37a to 37h are displayed on the setting screen 37.

The selection item 37a indicates that the output mode is set to the 'single display' and a monitor 1 is set to an 'LCD', as shown in FIG. 6. The selection item 37b indicates that the output mode is set to the 'simultaneous display' and the monitor 1 and a monitor 2 are set to 'LCD' and 'CRT', as shown in FIG. 8. The selection item 37c indicates that the output mode is set to the 'single display' and the monitor 1 is set to the 'CRT', as shown in FIG. 7. The selection item 37d indicates that the output mode is set to the 'simultaneous display' and the monitor 1 and the monitor 2 are set to the 'LCD' and the 'TV', as shown in FIG. 8. The selection item 37e indicates that the output mode is set to the 'single display' and the monitor 1 is set to the 'TV', as shown in FIG. 7. The selection item 37f indicates that the output mode is set to the 'multimode' and the monitor 1 is set to the 'LCD' and the monitor 2 is set to the 'CRT', as shown in FIG. 9. The selection item 37g indicates that the output mode is set to the 'multimode' and the monitor 1 is set to the 'LCD' and the monitor 2 is set to the 'TV', as shown in FIG. 9. The selection item 37h is a selection item for replacing the monitor 1 and the monitor 2 in the multimode indicated in the selection items 37f and 37g, as shown in FIG. 10.

The information processing apparatus 1 performs infrared receiving control processing for controlling the ON/OFF state of the infrared receiving device on the basis of the switching information 30, for example, when a user sets an output destination related to display processing by selecting one of the selection items displayed on the selection screen 37 through the input device 22. Procedures when the information processing apparatus 1 performs the infrared receiving control processing will be described on the basis of a flow chart shown in FIG. 11. Hereinafter, the term of 'step' is omitted like indicating 'step S101' as 'S101'.

Figure 11:
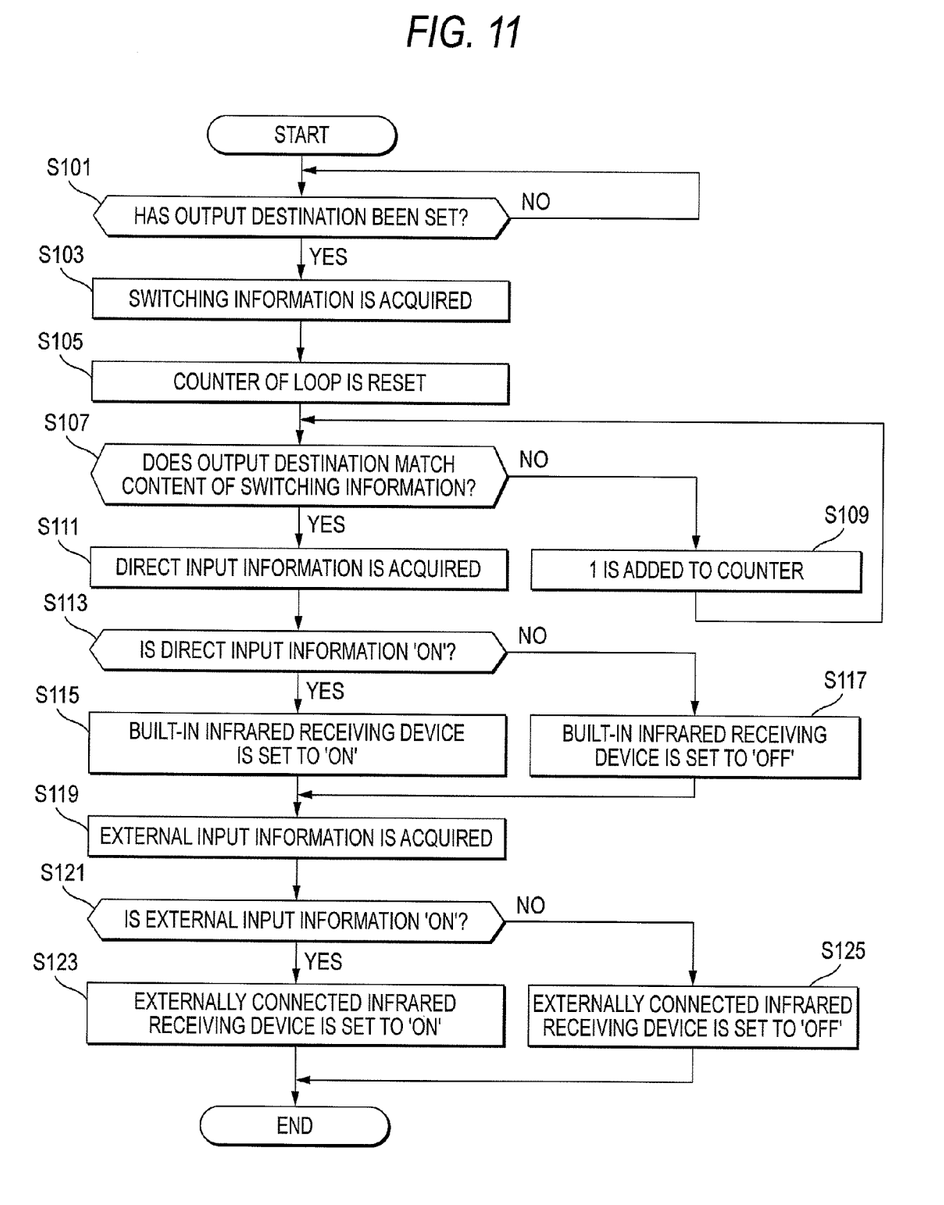
FIG. 11 is an exemplary flow chart illustrating procedures when the information processing apparatus performs infrared receiving control processing.

First, the CPU 11 determines whether or not an output destination of a display screen or sound is set when a display device is connected, for example (S101). This instruction is performed, for example, when a user sets the output destination of a display screen or sound by selecting one of the selection items 37a to 37h displayed on the setting screen 37 with the input device 22. In addition, the selection items 37a to 37h indicate output destinations of the display screen or sound and are used for determination for setting the ON/OFF state of the infrared receiving device to be described below. In the case when the output destination of the display screen or sound is not set (No in S101), the CPU 11 is on standby.

In the case when the output destination of the display screen or sound is set (Yes in S101), the CPU 11 acquires the switching information 30 from the HD drive 13 (S103). In the switching information 30, the output destination of the display screen or sound and the ON/OFF state of the infrared receiving device correspond to each other. In addition, the CPU 11 resets the counter of a loop (S105). The loop in this case is a loop for searching the switching information 30 in order to acquire information, which corresponds to the output destination of the display screen or sound set in step S101, from the switching information 30 acquired in step S103.

The CPU 11 determines whether or not the output destination of the display screen or sound set in step S101 matches display device information of the switching information 30 acquired in step S103 (S107). In the case when the output destination of the display screen or sound does not match the display device information of the switching information 30 (No in S107), the CPU 11 adds 1 to the counter of the loop reset in step S105 (S109). Then, the CPU 11 returns to step S107 to determine whether or not the output destination of the display screen or sound matches next display device information of the switching information 30.

In the case when the output destination of the display screen or sound matches the display device information of the switching information 30 (Yes in S107), the CPU 11 acquires the direct input information 34, which corresponds to the output destination of the display screen or sound set in step S101, from the switching information 30 (S111).

The CPU 11 determines whether or not the direct input information 34 acquired in step S1 is 'ON' (S113). In the case when the direct input information 34 is 'ON' (Yes in S113), the CPU 11 sets the infrared receiving function of the built-in infrared receiving device (infrared receiving unit 19) to ON (S115). On the other hand, in the case when the direct input information 34 is 'OFF' (No in S113), the CPU 11 sets the infrared receiving function of the built-in infrared receiving device (infrared receiving unit 19) to OFF (S117).

Then, the CPU 11 acquires the external input information 35, which corresponds to the output destination of the display screen or sound set in step S101, from the switching information 30 (S119). Then, the CPU 11 determines whether or not the external input information 35 acquired in step S119 is 'ON' (S121).

In the case when the external input information 35 is 'ON' (Yes in S121), the CPU 11 sets the infrared receiving function of the external infrared receiving device 4 connected to the infrared device connecting unit 20 to ON (S123). On the other hand, in the case when the external input information 35 is 'OFF' (No in S121), the CPU 11 sets the infrared receiving function of the external infrared receiving device 4 to OFF (S125).

Here, regarding some setting items of the switching information 30 shown in FIG. 4, a specific example of a case in which an ON/OFF state of the infrared receiving device is set according to the flow chart shown in FIG. 11 is shown. In the case when the single display of the LCD is set in step S101, the direct input information 34 in the switching information 30 is set to 'ON'. Accordingly, the infrared receiving function of the built-in infrared receiving device is set to 'ON' in step S115. In this case, it is preferable that the user operate the infrared emitting device 7 (remote controller) toward the information processing apparatus 1.

In addition, in the case when CRT single display or TV single display is set in step S101, the direct input information 34 is set to 'OFF' and the external input information 35 is set to 'ON'. Accordingly, the infrared receiving function of the built-in infrared receiving device is set to 'OFF' in step S117 and the infrared receiving function of the external infrared receiving device 4 is set to 'ON' in step S123. In this case, it is preferable that the user operate the infrared emitting device 7 (remote controller) toward the CRT 5 or TV 6.

In addition, in the case when the simultaneous display of LCD and CRT is set in step S101, the direct input information 34 is set to 'ON' and the external input information 35 is set to 'OFF'. Accordingly, the infrared receiving function of the built-in infrared receiving device is set to 'ON' in step S115 and the infrared receiving function of the external infrared receiving device 4 is set to 'OFF' in step S125. In this case, it is preferable that the user operate the infrared emitting device 7 (remote controller) toward the information processing apparatus 1.

In addition, in the case when the simultaneous display of LCD and TV is set in step S101, the direct input information 34 is set to 'OFF' and the external input information 35 is set to 'ON'. Accordingly, the infrared receiving function of the built-in infrared receiving device is set to 'OFF' in step S117 and the infrared receiving function of the external infrared receiving device 4 is set to 'ON' in step S123. In this case, it is preferable that the user operate the infrared emitting device 7 (remote controller) toward the TV 6.

In addition, in the case when the multi monitor where the LCD is used as the monitor 1 and the CRT is used as the monitor 2 or the multi monitor where the TV is used as the monitor 1 and the LCD is used as the monitor 2 is set in step S101, the direct input information 34 is set to 'ON' and the external input information 35 is set to 'OFF'. Accordingly, the infrared receiving function of the built-in infrared receiving device is set to 'ON' in step S115 and the infrared receiving function of the external infrared receiving device 4 is set to 'OFF' in step S125. In this case, it is preferable that the user operate the infrared emitting device 7 (remote controller) toward the information processing apparatus 1.

In addition, in the case when the multi monitor where the CRT is used as the monitor 1 and the LCD is used as the monitor 2 or the multi monitor where the LCD is used as the monitor 1 and the TV is used as the monitor 2 is set in step S101, the direct input information 34 is set to 'OFF' and the external input information 35 is set to 'ON'. Accordingly, the infrared receiving function of the built-in infrared receiving device is set to 'OFF' in step S117 and the infrared receiving function of the external infrared receiving device 4 is set to 'ON' in step S123. In this case, it is preferable that the user operate the infrared emitting device 7 (remote controller) toward the CRT 5 or TV 6.

In such a manner, the information processing apparatus 1 sets the ON/OFF state of each of the infrared receiving devices on the basis of the output destination of the display screen or sound and the switching information 30 stored in the HD drive 13 in the case when the user sets the output destination of the display screen or sound.

In the case of outputting the display screen or sound to two liquid crystal devices built in the main body when starting AV application in the information processing apparatus 1, the user can operate the AV application by setting the built-in infrared receiving device to 'ON' and operating the infrared emitting device 7 (remote controller) toward the direction of the TV 6.

On the other hand, in the case of outputting the display screen or sound from the information processing apparatus 1 to the TV 6 by providing the external infrared receiving device 4 near the TV 6 when starting AV application in the information processing apparatus 1, the user can operate the AV application by setting the infrared function of the external infrared receiving device 4 to 'ON' and operating the infrared emitting device 7 (remote controller) toward the direction of the TV 6.

In addition, although the example in which one of the infrared receiving device built in the information processing apparatus 1 and the external infrared receiving device 4 is set to 'ON' and the other one is set to 'OFF' has been described as the embodiment, the invention is not limited thereto. For example, both the devices may be set to 'ON' or 'OFF'. In addition, although the example in which two devices of the infrared receiving device built in the information processing apparatus 1 and the external infrared receiving device 4 are used as infrared receiving devices for receiving infrared rays has been described, the invention is not limited thereto. For example, even in the case when the information processing apparatus 1 includes three or more infrared receiving devices, the same infrared receiving control processing is performed.

In addition, although only the case where the user sets the ON/OFF state of the infrared receiving device according to switching of a display device by using the utility or the setting screen 40 has been described in the embodiment, an application executed, opening and closing of an Lid (liquid crystal panel) of the liquid crystal display 23, Dock/Undock of a docker, monitor off of the liquid crystal display 23, a screen saver operation, and the like may be associated with the ON/OFF state of the infrared receiving device.

In addition, although the example where an infrared ray emitted from the infrared emitting device 7 is received in the infrared receiving unit 19 or the external infrared receiving device 4 has been described in the embodiment, the invention is not limited thereto. For example, the infrared emitting device 7 may be an information transmitting device that transmits predetermined information and the infrared receiving device may be a receiving device that receives information transmitted from the information transmitting device.

In the information processing apparatus 1 according to the invention, a means for defining information indicating the ON/OFF state of the infrared receiving device at the time of display device switching is provided to a user and the external display device is connected. Accordingly, a user's troublesome operation at the time of display device switching can be reduced by setting the ON/OFF state of each infrared receiving device according to the information when the display device is switched.

Although the case where a function of executing the invention is recorded beforehand inside the apparatus has been described as the information processing apparatus 1 according to the invention, the invention is not limited thereto. For example, the same function may be downloaded from a network to the apparatus or a recording medium stored with the same function may be installed in the apparatus. Any kinds of recording media including a CD-ROM may be used as long as the recording media can store a program and can be read by the apparatus.

As described with reference to the embodiment, there is provided an information processing apparatus that includes an infrared transmitting device (IR remote controller) and a plurality of infrared receiving devices and that can reduce a user's troublesome operation at the time of display device switching by switching an ON/OFF state of each infrared receiving device in synchronization with switching of a display device when an external display device is connected.

According to the information processing apparatus according to the embodiment, it is possible to provide an information processing apparatus that includes an infrared transmitting device (IR remote controller) and a plurality of infrared receiving devices and that can reduce a user's troublesome operation at the time of display device switching by switching an ON/OFF state of each infrared receiving device in synchronization with switching of a display device when an external display device is connected.

What is claimed is:

1. An information processing apparatus configured to output a display screen and sound to a plurality of display devices, the information processing apparatus comprising:
a transmitter;
a plurality of receivers configured to receive information transmitted from the transmitter;
a storage module configured to store a first information indicative of an output destination of a set of display data and sound data and second information indicative of either ON or OFF state of each receiver corresponding to the first information; and
a setting module configured to set the ON/OFF states based on the first information and the second information when the output destination of the set of display data and sound data is switched,
wherein the apparatus further comprises a main body housing the storage module, the setting module, and a main display,
wherein first at least one of the plurality of receivers is housed in the main body of the information processing apparatus, and
wherein second at least one of the plurality of receivers is provided outside of the information processing apparatus,
wherein the storage module is configured to store information indicating that an external display device is an output destination of the display screen and the sound, and to correspondingly store information indicating that the receiver in the main body is turned off and the receiver provided outside is turned on, and
the setting module is configured to turn off the receiver in the main body and to turn on the receiver provided outside when the output destination of the display screen and the sound is switched to the external display device.

2. An information processing apparatus configured to output a display screen and sound to a plurality of display devices, the information processing apparatus comprising:
a transmitter;
a plurality of receivers configured to receive information transmitted from the transmitter;
a storage module configured to store a first information indicative of an output destination of a set of display data and sound data and second information indicative of either ON or OFF state of each receiver corresponding to the first information; and
a setting module configured to set the ON/OFF states based on the first information and the second information when the output destination of the set of display data and sound data is switched,
wherein the apparatus further comprises a main body housing the storage module, the setting module, and a main display,
wherein first at least one of the plurality of receivers is housed in the main body of the information processing apparatus, and
wherein second at least one of the plurality of receivers is provided outside of the information processing apparatus,
wherein the storage module is configured to store information indicating that a display device in the main body is an output destination of the display screen and the sound, and to correspondingly store information indicating that the receiver in the main body is turned on and the receiver provided outside is turned off, and
the setting module is configured to turn on the receiver in the main body and to turn off the receiver provided outside when the output destination of the display screen and the sound is switched to the display device in the main body.

3. An information processing apparatus configured to output a display screen and sound to a plurality of display devices, the information processing apparatus comprising:
a transmitter;

a plurality of receivers configured to receive information transmitted from the transmitter;

a storage module configured to store a first information indicative of an output destination of a set of display data and sound data and second information indicative of either ON or OFF state of each receiver corresponding to the first information; and a setting module configured to set the ON/OFF states based on the first information and the second information when the output destination of the set of display data and sound data is switched, wherein the apparatus further comprises a main body housing the storage module, the setting module, and a main display, wherein first at least one of the plurality of receivers is housed in the main body of the information processing apparatus, and wherein second at least one of the plurality of receivers is provided outside of the information processing apparatus, wherein the storage module is configured to store information indicating that both a display device in the main body and an external display device are output destinations of the display screen and the sound, and to correspondingly store information indicating that the receiver in the main body is turned on and the receiver provided outside is turned off, and the setting module is configured to turn on the receiver in the main body and to turn off the receiver provided outside when an output destination of the display screen and the sound switches to a simultaneous output mode by the display device in the main body and the external display device.

4. An information processing apparatus configured to output a display screen and sound to a plurality of display devices, the information processing apparatus comprising:

a transmitter;

a plurality of receivers configured to receive information transmitted from the transmitter;

a storage module configured to store a first information indicative of an output destination of a set of display data and sound data and second information indicative of either ON or OFF state of each receiver corresponding to the first information; and a setting module configured to set the ON/OFF states based on the first information and the second information when the output destination of the set of display data and sound data is switched, wherein the apparatus further comprises a main body housing the storage module, the setting module, and a main display, wherein first at least one of the plurality of receivers is housed in the main body of the information processing apparatus, and wherein second at least one of the plurality of receivers is provided outside of the information processing apparatus, wherein the storage module is configured to store information indicating that both a display device in the main body and an external display device are output destinations of the display screen and the sound, and to correspondingly store information indicating that the receiver in the main body is turned off and the receiver provided outside is turned on, and the setting module is configured to turn off the receiver in the main body and to turn on the receiver provided outside when an output destination of the display screen and the sound switches to a simultaneous output mode by the display device built in the main body and the external display device.

* * * * *